Jan. 28, 1958    J. A. GEMIGNANI    2,821,080
TENSION GAGE FOR TESTING THE BOND BETWEEN BRAZED PARTS
Filed May 6, 1954
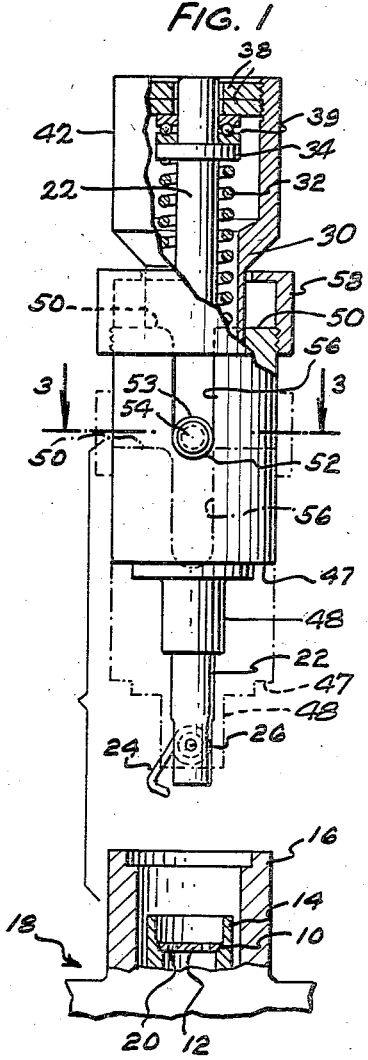
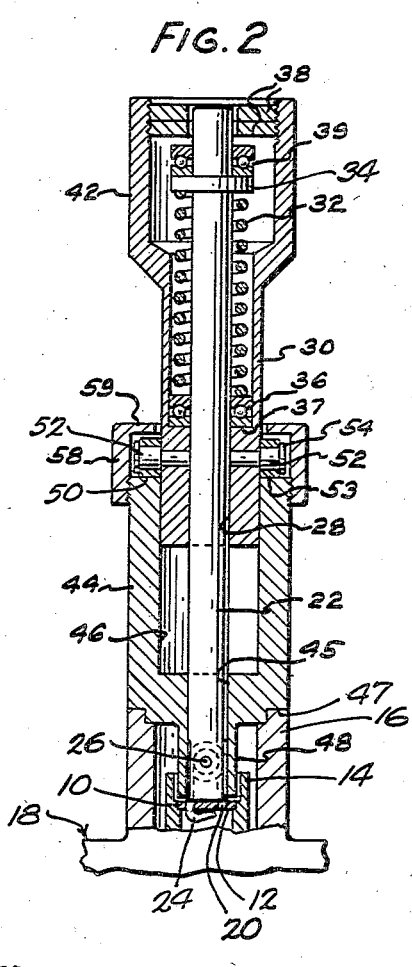
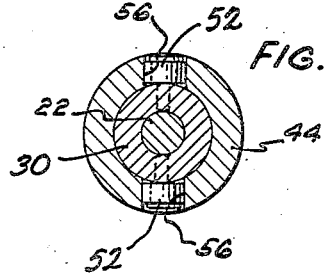
INVENTOR
J. A. GEMIGNANI
BY C. B. Hamilton
ATTORNEY

United States Patent Office 2,821,080
Patented Jan. 28, 1958

2,821,080

TENSION GAGE FOR TESTING THE BOND BETWEEN BRAZED PARTS

Julius A. Gemignani, Elmwood Park, Ill., assignor to Western Electric Company, Incorporated, New York, N. Y., a corporation of New York Application May 6, 1954, Serial No. 428,066

6 Claims. (Cl. 73—88)

This invention relates to tension gages and more particularly to a tension gage for testing the bond between brazed parts.

An object of the invention is to provide an improved tension gage for testing the strength of the bond between brazed parts.

Another object of the invention is to provide a tension gage having means insertable in a hollow member for establishing a connection with a part which is brazed to another part and for applying a predetermined tension thereto to test the strength of the bond between said brazed parts.

A further object of the invention is to provide a tension gage for testing the bond between two parts and having a movable connector means engageable with one of the said parts and having a seating means engageable with the other of said parts and movable from one position for holding said connector means in engagement with said one part to another position in spaced relation to said connector means for rendering it more readily applicable to said one part.

A gage illustrating certain features of the invention for applying a predetermined tension to an apertured part which is brazed to and within a hollow article for testing the bond therebetween may include a rod having a hook pivoted on one end thereof which is moved into the hollow article and inserted in an aperture in said apertured part to establish a connection therewith, and a sleeve mounted on the rod and disposed in spaced relation to the hook during the insertion thereof is moved into engagement with the hook to hold it in engagement with said apertured part, said sleeve having a seat engageable with the end of the hollow article for supporting the gage thereon. A spring encircling the rod and engaging a shoulder thereon is held in pre-loaded condition by a tubular member which is slidably and rotatably mounted on the rod and has cam followers cooperable with cams on the sleeve and operable when said tubular member is turned relative to the sleeve for imparting a predetermined axial movement to the tubular member to further compress the spring and apply the pressure thereof to the rod, the hook, and the apertured part connected thereto.

Other objects and advantages of the invention will become apparent by reference to the following detailed description and the accompanying drawings illustrating a preferred embodiment thereof, in which Fig. 1 is a side elevational sectional view of the gage with parts in section shown in spaced relation to a portion of an article which is to be tested;

Fig. 2 is a vertical sectional view of the gage applied to the article and showing parts of the gage in a different position; and Fig. 3 is a cross-sectional view taken on the line 3—3 of Fig. 1.

The present gage is designed to test the strength of the brazed joint 10 between an apertured disc 12 and a tubular portion 14 disposed within a hollow part 16 of a magnetron 18. The disc 12 has a pair of apertures 20 therein.

The gage comprises a round rod 22, the lower end of which is slotted for receiving a hook 24 which is oscillatably supported on a pin 26 secured to the bifurcated ends of the rod. The rod 22 is slidably supported in an aperture 28 in a tubular member 30 and has a helical compression spring 32 encircling the rod within the member 30 and with one end of the spring engaging a collar 34 on the rod 22. The other end of the spring 32 bears against an anti-friction ball bearing 36 which seats against a shoulder 37 formed in the member 30. The compression spring 32 is adapted to be compressed to apply a predetermined pressure to the rod 22 and impart a longitudinal movement thereto, which movement is limited by a stop element 38 in the form of a pair of annular discs threadedly engaging the upper enlarged end of the tubular member 30. A ball bearing 39 is interposed between the collar 34 and stop 38 for cooperation with the ball bearing 36 to permit free rotary movement of the rod 22 and the spring 32 relative to the tubular member 30.

The anti-friction bearings 36 and 39 may be omitted if desired so that the lower end of the spring bears on the shoulder 37 of the member 30 and the stop 38 engages the upper face of the collar 34. The spring 32 is compressed to a predetermined pre-loaded condition and is held in this pre-loaded condition between the shoulder 37 and the stop element 38 of the tubular member 30 whereby the element 30 need be moved only a small distance relative to the rod 22 to apply the predetermined pressure of the spring to the rod and the hook 24. The upper portion of the member 30 is enlarged and the outer periphery thereof is knurled to provide a knob or handle portion 42 by means of which the operator may grip and turn the member 30.

Means are provided for supporting the gage on the hollow part 16 and for imparting longitudinal movement to the tubular member 30 to further compress the spring and apply the force thereof to the rod 22, the hook 24, and the apertured part 12. This means includes a sleeve or apertured member 44 which has a bore 45 for slidably receiving the rod and has an enlarged bore 46 for slidably receiving the reduced end of the element 30. An annular shoulder 47 formed on the lower end of the sleeve 44 is engageable with the upper edge of the hollow part 16 for supporting the gage in vertical position as shown in Fig. 2 and a reduced extension 48 on the lower end of the sleeve is adapted to fit within the tubular portion 14 of the magnetron and hold the hook 24 in operative position. At its upper end the sleeve 44 is provided with cam surfaces 50 which cooperate with a pair of cam followers 52 mounted on opposite sides of the element 30 for raising the head 42 relative to the rod 22 to further compress the spring 32 and apply the force thereof to the rod 22 and the hook 24 to the disc 12. The cam followers are in the form of rollers 53 rotatably supported on studs 54 which are pressed into the tubular member 30. A pair of slots 56 extending from the upper end of the sleeve provide clearance for the cam followers 52 and permit limited movement longitudinally of the sleeve 44 to and from the full and dotted positions shown in Fig. 1 whereby the sleeve may be moved relative to the rod to uncover the hook 24 to facilitate the insertion of the hook 24 into an aperture 20 in the disc 12. A ring 58 threaded on the upper end of the sleeve 44 has an inwardly extending flange 59 which is engageable by the cam followers 52 and serves as a stop to limit the upward movement of the member 30 relative to the sleeve 44.

After the hook 24 has been inserted through the aperture 20 to establish a locking connection with the disc 12, the sleeve 44 is moved downwardly into engagement therewith to lock it in operative position (Fig. 2) and to place the shoulder 47 of the sleeve 44 on the upper end of the part 16 for supporting the gage thereon. In this position the cam followers 52 are disposed near the upper end of the slots 56 and the handle portion 42 of the member 30 may then be engaged by the operator and rotated through one-half revolution to cause the cam followers 52 to ride up on the sloping portions of the cam 50 onto the flat upper surfaces thereof and raise the member 30, thus raising the stop element 38 from the bearing 39 and the rod 22 and thereby effecting the application of the spring pressure through the rod 22 and the hook 24 thereon to the disc 12 for testing the brazed juncture 10. The end of the tubular extension 48 is disposed adjacent the disc 12 to limit its movement in the event the brazed joint 10 fails. The momentary application of a predetermined pressure to the disc 12 effected during the movement of the member 30 through one-half revolution is sufficient for the purposes of testing the strength of the brazed juncture 10. To remove the gage, the sleeve 44 is raised on the rod 22 to the position shown in full lines in Fig. 1, after which the gage may be tilted and the hook 24 disengaged from the disc 12.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A tension gage for testing the bond between a hollow part and an apertured element brazed to and within the hollow part comprising a rod having a hook on one end thereof insertable in an aperture in said apertured part to establish a connection therewith, a compression spring on said rod for applying force thereto, a tubular member mounted for rotary and longitudinal movement on said rod for compressing said spring, a sleeve slidably mounted on said rod for longitudinal movement into engagement with said hook for locking it to said apertured part, said sleeve having a seat engageable with said hollow part for supporting said gage thereon, and cam means on said tubular member and said sleeve operable to impart longitudinal movement to said tubular member in response to rotation thereof for compressing the spring and applying a predetermined force through said rod and said hook to the apertured part.

2. A tension gage for testing the bond between a hollow part and an apertured disc brazed to and within the hollow part comprising a rod having a hook pivoted to one end thereof insertable in an aperture in said disc to establish a connection therewith, a compression spring on said rod for applying force thereto in response to compression of said spring, a tubular member slidably mounted on said rod for enclosing and compressing said spring, a cam follower on said member, a sleeve slidably mounted on said rod and having a seat engageable with said hollow part for supporting said gage thereon, a cam on said sleeve cooperable with said cam follower for effecting relative axial movement between said member and said sleeve in response to rotation of said tubular member for compressing the spring and applying a predetermined tension to said rod and said hook and to the disc connected thereto.

3. A tension gage for testing the bond between a hollow part and an apertured part brazed to and within the hollow part comprising a rod having a hook on one end thereof insertable in an aperture in said apertured part to establish a connection therewith, a compression spring on said rod for applying force thereto, a tubular member mounted for longitudinal and rotary movement on said rod for compressing said spring in response to axial movement thereof, means on said member for holding said spring under a predetermined compression, a sleeve member mounted for longitudinal movement on said rod and having a seat engageable with said hollow part for supporting the gage thereon, and cooperable cam means on said tubular and said sleeve members for imparting longitudinal movement to said tubular member relative to the rod in response to rotation of said tubular member to effect the application of the force of said spring to the rod and the apertured part connected thereto.

4. A tension gage for testing the bond between a hollow part and an apertured part brazed to and within the hollow part comprising a rod having a hook pivotally connected to one end thereof insertable in an aperture in said apertured part to establish a connection therewith, a compression spring on said rod having one end thereof engageable with the rod for applying force thereto in response to compression of the spring, a tubular member mounted for longitudinal and rotary movement on said rod for compressing said spring in response to axial movement thereof in one direction, a sleeve member mounted for longitudinal movement on said rod into engagement with said hook for locking it in engagement with said element, said sleeve member having a seat engageable with said hollow part for supporting the gage thereon, and cooperable cam means on said tubular and said sleeve members for imparting axial movement to said tubular member in said one direction in response to rotation thereof to effect the application of the force of said spring to the rod and the element connected thereto.

5. A tension gage for applying a predetermined force to an apertured part which is brazed to and within a hollow part for testing the bond therebetween comprising a rod having a hook pivoted to one end thereof insertable in an aperture in said apertured part to establish a connection therewith and having a collar formed thereon in spaced relation to said hook, a compression spring on said rod having one end engageable with one side of said collar, a tubular member mounted on said rod for longitudinal and rotary movement for compressing said spring in response to longitudinal movement, said tubular member having a shoulder engageable with the opposite end of the spring and engageable with said collar for maintaining said spring under a predetermined compression, a sleeve member mounted for longitudinal movement on said rod into engagement with said hook to lock it in engagement with said apertured part and having a seat engageable with said hollow part for supporting the gage thereon, and cam means including a cam follower on one of said members and a cam on the other member for imparting longitudinal movement to said tubular member in response to rotation thereof to effect the application of the force of the spring through the rod and hook to the apertured part connected thereto.

6. A tension gage for testing the bond between a hollow part and an apertured part brazed to and within the hollow part comprising a rod having a hook pivoted to one end thereof and insertable in an aperture in said disc to establish a connection therewith, said rod having a collar formed thereon in spaced relation to said hook, a compression spring on said rod having one end engageable with one side of said collar, a member mounted for longitudinal and rotary movement on said rod for compressing and enclosing said spring and having a shoulder positioned adjacent the opposite end thereof, a first anti-friction bearing interposed between said shoulder and said other end of the spring, a second anti-friction bearing mounted on said rod in engagement with the other side of said collar, an element on said member engageable with said second bearing for cooperation with said shoulder to maintain said spring under a predetermined compression, a sleeve member mounted on said rod for longitudinal movement into engagement with said hook for locking it in engagement with said apertured part, said sleeve member having a seat engageable with said hollow part for supporting the gage thereon, and cam means including a cam follower on one of said members and a cam on the other member for imparting longitudinal movement to said tubular member in response to rotation thereof to effect the application of the force of said spring to the rod, the hook, and the apertured part connected thereto in response to the relative turning movement between said first and said second apertured members from said second bearing to effect the application of the force of said spring to said rod.

References Cited in the file of this patent

UNITED STATES PATENTS

| | | |
|---|---|---|
| 166,366 | Hebon | Aug. 3, 1875 |
| 673,526 | Moore | May 7, 1901 |